Reissued July 19, 1949 Re. 23,134

UNITED STATES PATENT OFFICE 23,134

TEXTILE PRINTING PASTE

Norman S. Cassel, Ridgewood, N. J., assignor to Interchemical Corporation, New York, N. Y., a corporation of Ohio No Drawing. Original No. 2,376,319, dated May 15, 1945, Serial No. 337,493, May 27, 1940. Application for reissue May 13, 1946, Serial No. 669,210

9 Claims. (Cl. 8—62)

This invention relates to the art of textile printing, and is directed particularly to new textile printing pastes comprising emulsions of aqueous dyestuff solutions emulsified in hydrophobe solutions in volatile organic solvents of rubber and the like.

The conventional method of textile printing involves the application to a textile fabric of a dye or a dye component in water solution, by means of an intaglio cylinder. In order to get the dyestuff solution thick enough to remain in the cells of the printing cylinders, and to remain in place when applied to the fabric, water-soluble thickening agents such as British gum, starch and the like are used. More recently, wetting agents have been added to the pastes to improve their printing properties. After printing, the dyes are set by various means so that they become water-insoluble, and the fabric is washed to remove the water-soluble thickeners.

Certain difficulties are encountered with these conventional dyestuff pastes. Since the fabrics printed are rather water-absorbent, prints made with water solutions, even when made viscous with the water-soluble thickeners, tend to spread out slightly from the point of application, a phenomenon known as flushing. As a result, the lines in the engraving may become somewhat blurred, and very fine lines close together may be entirely lost. When the viscosities of the pastes are adjusted so that no flushing occurs, the pastes become too thick to separate cleanly from the engravings. A compromise must always be made, so that effective separation occurs without substantial flushing; and the cylinders must be so prepared as to print most easily. Fine photogravure engravings have, as a consequence, never been used with conventional textile printing pastes, because their faithful reproduction of detail would not register on the fabric. Furthermore, the engravings used must be rather deep in order to get effective printing, and considerably more paste is used than is really necessary to produce most designs.

Another disadvantage of conventional dyestuff pastes is that a substantial quantity of dyestuff may be washed out with the thickeners. This is due partially to mechanical suspension of converted dyestuff in the film of thickener, partially to incomplete conversion of the dyestuff to the insoluble form, due to the trapping of the soluble dyestuff inside of the thickener film, and, in some cases, partially to actual dyeing of the thickener. This may represent a serious loss of dyestuff.

In my copending application, Serial No. 215,585, filed June 24, 1938, (patented May 28, 1940, No. 2,202,283) of which this is a continuation in part, I have disclosed a means whereby these disadvantages may be overcome, and successful dyestuff printing can be done with photogravure and other relatively shallow engravings, with the retention of the complete detail of the photogravure cylinders, and the use of a minimum of dyestuff. As therein disclosed, this means comprises the preparation of dyestuff printing pastes by the emulsification of an aqueous solution of a dye or a dye component with a water-immiscible bodying composition (preferably a solution of a film-forming thickener in a solvent), the dyestuff solution being in the discontinuous phase. The resultant emulsion, of optimum consistency for printing, is applied to a fabric, as with a conventional intaglio cylinder; the dyestuff is fixed on the fabric, and the fabric is then dried, with or without washing, depending on the dyestuff employed.

As the emulsion is applied to the cloth and the emulsion breaks, the dyestuff solution penetrates into the yarns of the fabric. Since the outer phase and the bodying agent are mutually repellent, the non-aqueous phase helps to prevent undue spreading of the aqueous phase. As a result, substantially no flushing occurs, and fine printing is obtained, which preserves the fine lines of a photogravure engraving even on materials which are as difficult to print as cotton flannels.

The problem of making stable emulsions with very low percentages of solids is of extreme importance in this type of paste, since the lower the solid content of the emulsion, the higher is the efficiency of the dyeing. Furthermore, the substances used to produce the stability in the emulsions should be highly resistant to acid and alkali, in order to insure stability with a maximum number of dyestuffs.

I have now discovered that polymeric hydrocarbons of the rubber type (such as rubber, chloroprene, high-molecular weight isobutylene polymers and the like) may be used, in combination with other film-forming agents, to produce unusually effective water-in-lacquer emulsion printing pastes with maximum stability and minimum solids content. These materials may all be designated as natural or synthetic rubber.

It is desirable that the rubber be used in conjunction with other film forming agents, in order to produce optimum results. Rubber alone produces emulsions with no marked advantages over ordinary film-forming agents such as cellulose derivatives and synthetic resins.

Typical examples of my invention are:

EXAMPLE 1

*Rubber with ethyl cellulose*

A concentrate is made by blending—

| | Parts by weight |
|---|---|
| Latex (40%) | 12.5 |

with a lacquer comprising—

| | |
|---|---|
| 250 centipoise ethyl cellulose | 6.0 |
| Butanol | 9.0 |
| Xylene | 35.0 |
| Solvesso #3 (hydrogenated petroleum naphtha—boiling range 175–210° C.) | 37.5 |

The rubber transfers to the organic phase, leaving the water in suspension in the lacquer.

This may be used to produce a textile printing paste, using the following:

| | Parts by weight |
|---|---|
| Above concentrate | 3.3 |
| Solvesso #2 (hydrogenated petroleum naphtha—boiling range 135–177° C.) | 23.7 |
| Aqueous dyestuff solution as desired | 73.0 |

This is an unusually stable emulsion, and is particularly good with alkaline dye pastes, such as vat dyestuffs, and mixtures of stabilized diazo compounds and coupling components (Rapidogens, Diagens, etc.). The emulsion gives excellent prints, although it contains only 0.36% of film-forming material. The emulsion does not break, even in screen printing; a similar emulsion using only ethyl cellulose or rubber will break under similar circumstances.

EXAMPLE 2

*Rubber and resin*

A clear concentrate may be prepared comprising

| | Parts |
|---|---|
| Alkyd resin solution, comprising 50 alkyd resin (35% soya oil modified glycerol phthalate) in 10 pine oil and 40 Solvesso #2) | 31 |
| Milled rubber solution (15% in Solvesso #2) | 27 |
| Linseed oil | 3 |
| Solvesso #3 | 8 |
| 20% NaCl solution | 25 |
| Sulfonated tannin (35% aqueous solution) | 4 |
| 80% acetic acid | 2 |

The aqueous material is emulsified as the inner phase of a lacquer; such a concentrate is far easier to emulsify with further solvent and water than a lacquer with no water already in it.

This concentrate may be made into a printing paste by using—

| | Gallons |
|---|---|
| Concentrate | 5 |
| Solvesso #2 | 26 |
| Aqueous dyestuff solution (for example, a 5% solution of Variamine Blue RT—Schultz Color Index—Supplementary #1—#114A) | 69 |

It is especially useful in making emulsions of acid solutions of dyestuffs.

EXAMPLE 3

The properties of the concentrates of Example 2 can be reproduced with somewhat less rubber, by using latex to replace the rubber. Thus, 8 parts of 40% latex (3.2 rubber solids) is as effective as 27 parts of a 15% milled rubber solution (4.05 rubber solids). The rubber also flushes into the solvent with less difficulty than is required in dissolving the milled rubber.

EXAMPLE 4

Choroprene synthetic rubber produces substantially the same results as rubber when made into the concentrate and emulsion of Example 2.

While I have shown only a few examples of my invention, it is obvious that examples may be multiplied indefinitely without departing from the scope thereof, which is defined in the claims.

It is obvious that other dyestuffs of the types shown may be used, and that dyestuff components of other types (direct dyestuffs, mordant dyestuffs, etc.) may be applied to the cloth by the compositions described herein. Obviously, acid, alkali and other chemicals necessary to put the dyestuffs in solution may be added. Care should, however, be taken that the continuous phase of the emulsion be not attacked by the particular aqueous system employed.

With respect to the continuous outer phase, the dissolved substance chosen to be used with the rubber should be soluble in the same solvents as the rubber, and should be sufficiently film-forming to be capable of forming a continuous phase about the dyestuff solution. I have found that water-immiscible solutions in organic solvents of most water-insoluble film-forming organic compounds may be used successfully, and have successfully used bodied oils, alkyd resins, hydrophobe urea-formaldehyde resins, cumarone-indene resin, natural resins such as dammar and batu, rosin glycerol ester gums, cellulose esters such as nitrocellulose and cellulose acetate, and cellulose ethers such as benzyl and ethyl cellulose, and heavy metal fatty acid soaps which promote water-in-oil emulsification. The second constituent may be rubber or synthetic rubber-like materials such as polychloroprene, polyisobutylene and the like. Substantially any water-immiscible solvents may be used; water-miscible solvents should be present in no more than small percentages, or the stability of the emulsions may be seriously impaired.

The amount of rubber plus other film formers employed should be kept at a minimum consonant with stability of the emulsion, and in general the continuous phase should likewise be kept at a minimum. The concentrated materials contain unusually high percentages of film solids; but the paste ready to use ordinarily contains 2% or less of film-forming solids, and should not exceed 5% for best results.

In the specification and claims, the term "dyestuff" means a complete dye or a component of a dye, and the term "undeveloped dyestuff" means that the dye or dye component is in such form that it lacks the color of the finished dye on the fabric.

I claim:

1. A textile decorating composition comprising an emulsion, the inner phase of which comprises an aqueous liquid, and the outer phase of which comprises a water-immiscible solution of a plurality of film-forming substances comprising 5% or less of the weight of the composition, and dissolved in a volatile water-immiscible organic solvent, one of the film-forming substances being of the class of elastomers consisting of natural rubber and chloroprene and isobutylene polymers, whereby the emulsion is substantially more stable than a similar emulsion without the elastomer, or a similar emulsion of the elastomer alone.

2. A textile decorating composition comprising an emulsion, the inner phase of which comprises an aqueous dyestuff solution, and the outer phase of which comprises a water-immiscible solution of a plurality of film-forming substances comprising 5% or less of the weight of the composition, and dissolved in a volatile water-immiscible organic solvent, one of the film-forming substances being of the class of elastomers consisting of natural rubber and chloroprene and isobutylene polymers, whereby the emulsion is substantially more stable than a similar emulsion without the elastomer, or a similar emulsion of the elastomer alone.

3. A textile decorating composition comprising an emulsion, the inner phase of which comprises an aqueous dyestuff solution, and the outer phase of which comprises a water-immiscible solution of a plurality of film-forming substances comprising 2% or less of the weight of the composition, and dissolved in a volatile water-immiscible organic solvent, one of the film-forming substances being of the class of elastomers consisting of natural rubber and chloroprene and isobutylene polymers, whereby the emulsion is substantially more stable than a similar emulsion without the elastomer, or a similar emulsion of the elastomer alone.

4. The composition of claim 2, in which the dyestuff is undeveloped.

5. A textile decorating composition comprising an emulsion, the inner phase of which comprises an aqueous dyestuff solution, and the outer phase of which comprises a water-immiscible solution of a plurality of film-forming substances comprising 5% or less of the weight of the composition, and dissolved in a volatile water-immiscible organic solvent, one of the film-forming substances being natural rubber, whereby the emulsion is substantially more stable than a similar emulsion without the rubber, or a similar emulsion with rubber alone.

6. A colored emulsion, capable of coloring flexible materials such as fabrics and fibers, which comprises a water-in-oil type of emulsion, the oil phase of which comprises at least one organic solvent containing therein at least one water-insoluble, organic, film-forming, thermosetting material, soluble in said solvent and capable of rapid setting at moderate temperatures; together with at least one elastomer selected from the group consisting of natural rubber, chloroprene polymers, and isobutylene polymers; the amount of thermosetting material being sufficient to produce an emulsion of printable consistency but insufficient to materially stiffen textile fabrics colored with the emulsion and insufficient to cause adhesion to the application machinery.

7. A colored emulsion, capable of coloring flexible materials such as fabrics and fibers, which comprises a water-in-oil type of emulsion, the oil phase of which comprises at least one organic solvent containing therein at least one water-insoluble alkyd resin, soluble in said solvent and capable of rapid setting at moderate temperatures, together with at least one elastomer selected from the group consisting of natural rubber, chloroprene polymers, and isobutylene polymers; the amount of alkyd resin being sufficient to produce an emulsion of printable consistency but insufficient to materially stiffen textile fabrics colored with the emulsion and insufficient to cause adhesion to the application machinery.

8. A colored emulsion, capable of coloring flexible materials such as fabrics and fibers, which comprises a water-in-oil type of emulsion, the oil phase of which comprises at least one organic solvent containing therein at least one water-insoluble amino plastic, soluble in said solvent and capable of rapid setting at moderate temperatures, together with at least one elastomer selected from the group consisting of natural rubber, chloroprene polymers, and isobutylene polymers; the amount of amino plastic being sufficient to produce an emulsion of printable consistency but insufficient to materially stiffen textile fabrics colored with the emulsion and insufficient to cause adhesion to the application machinery.

9. A colored emulsion, capable of coloring flexible materials such as fabrics and fibers, which comprises a water-in-oil type of emulsion, the oil phase of which comprises at least one organic solvent containing therein at least one urea-formaldehyde resin, soluble in said solvent and capable of rapid setting at moderate temperatures, together with at least one elastomer selected from the group consisting of natural rubber, chloroprene polymers, and isobutylene polymers; the amount of urea-formaldehyde resin being sufficient to produce an emulsion of printable consistency but insufficient to materially stiffen textile fabrics colored with the emulsion and insufficient to cause adhesion to the application machinery.

NORMAN S. CASSEL.

No references cited.